(12) United States Patent  
Dacosta

(10) Patent No.: US 7,764,794 B2  
(45) Date of Patent: *Jul. 27, 2010

(54) LOCATION-BASED WIRELESS MESSAGING FOR WIRELESS DEVICES

(75) Inventor: Behram Mario Dacosta, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1276 days.

This patent is subject to a terminal disclaimer.

(21) Appl. No.: 11/288,751

(22) Filed: Nov. 28, 2005

(65) Prior Publication Data

US 2006/0078122 A1 Apr. 13, 2006

Related U.S. Application Data

(63) Continuation-in-part of application No. 10/397,934, filed on Mar. 25, 2003, now Pat. No. 6,978,023.

(51) Int. Cl.  
*H04K 1/00* (2006.01)

(52) U.S. Cl. ...................................... 380/270; 342/126

(58) Field of Classification Search ................... 380/270  
See application file for complete search history.

(56) References Cited

U.S. PATENT DOCUMENTS 6,011,973 A 1/2000 Valentine et al.

| 6,177,905 | B1* | 1/2001 | Welch | 342/357.13 |
|---|---|---|---|---|
| 6,424,840 | B1 | 7/2002 | Fitch et al. | |
| 2001/0034223 | A1* | 10/2001 | Rieser et al. | 455/404 |
| 2003/0091030 | A1 | 5/2003 | Yegin et al. | |
| 2004/0192311 | A1* | 9/2004 | Koskinen et al. | 455/440 |
| 2004/0203789 | A1* | 10/2004 | Hammond et al. | 455/440 |

FOREIGN PATENT DOCUMENTS

WO WO 00/51365 8/2000

* cited by examiner

*Primary Examiner*—Christopher J Brown  
(74) *Attorney, Agent, or Firm*—Blakely, Sokoloff, Taylor & Zafman LLP

(57) ABSTRACT

An apparatus and method of location-based wireless messaging wireless devices is described. The method includes the receipt of a location-based message request from a user of a wireless device desiring to receive a location-based message. Once the request is received, a spatial location of the wireless device is monitored. Once a current spatial location of the wireless device is identified, as a spatial location of a message delivery location, a location-based message is communicated. In one embodiment, a user, via a location-based message request, may request the delivery of the location-based message to a destination wireless device. In a further embodiment, a wireless device may periodically transmit the current spatial location of the wireless device to a predetermined destination wireless device. In a further embodiment, a wireless device may be notified when a selected wireless device is within a predetermined proximity. Other embodiments are described and claimed.

9 Claims, 15 Drawing Sheets

LOCATION-BASED WIRELESS MESSAGING FOR WIRELESS DEVICES

RELATED APPLICATIONS

This non-provisional patent application is a continuation-in-part and claims priority to U.S. patent application Ser. No. 10/397,934, filed Mar. 25, 2003, now U.S. Pat. No. 6,978,023.

FIELD

The invention relates generally to the field of wireless communication. More particularly, one or more of the embodiments relate to location-based wireless messaging wireless for wireless devices.

BACKGROUND

Wireless technology provides a mechanism for either replacing or extending traditional wired networks including, but not limited to, local area networks (LANs), personal area networks (PAN) and metropolitan area networks (MAN). Using radio frequency (RF) or RF technology, wireless networks transmit and receive data over the air, through walls, ceilings and even cement structures without wired cabling. For example, a wireless-LAN (WLAN) is a flexible data communication system. A WLAN provides all the features and benefits of traditional LAN technology, such as Ethernet and Token Ring, but without the limitations of being tethered together by a cable. This provides greater freedom and increased flexibility.

Wireless technology also provides a mechanism for cellular communication in the form of cellular networks. The cellular landscape is composed of both cooperating and competing cellular networks, or carriers. Carriers install a vast network of radio towers, referred to herein as "base stations" throughout their coverage area. For some carriers, their coverage area is very small, limited to just a portion of a state, while other carriers have a very large web that covers populated areas all over the entire country. Throughout their coverage area, carriers install a series of towers with slightly overlapping coverage.

Carriers are licensed a block of radio frequencies, which they can broadcast on in a specific area. The carrier then divides that block into smaller portions, which are assigned to individual towers. The base station can then divide the portion of frequency among a limited number of users. The total number of users a cell can support is often referred to as "capacity". Each base station has one or more antenna, which provide the coverage on its assigned frequency for that site, called the "cell". Cells are roughly circular and range from 0.5 to 6 miles in radius. Each base station is connected back to a central command center run by the carrier that owns the cell. The command center connects the cells together into a network, which is linked to the worldwide phone network.

Wireless devices, including but not limited to cellular phones, personal digital assistants, laptop computers, including a wireless transceiver, or other like mobile devices are able to make use of both wireless, as well as cellular, networks.

SUMMARY

One embodiment provides a method and apparatus of location-based wireless messaging for wireless devices. The method includes the receipt of a location-based message request from a user of a wireless device desiring to receive a location-based message. Once the request is received, a spatial location of the wireless device is monitored. Once a current spatial location of the wireless device is identified, as a spatial location of a message delivery location, a location-based message is communicated.

For example, in one embodiment, a user of a wireless device may desire the receipt of a message, referred to herein as a "location-based message," once the user of the wireless device reaches a message delivery location. In one embodiment, the wireless device is configured to monitor the spatial location of the respective wireless device. In an alternative embodiment, one or more base stations may monitor the current spatial location of the wireless device.

Accordingly, once the user arrives at a message delivery location, the wireless device, for example, displays the location-based message to the user. In one embodiment, a user, via a location-based message request, may request the delivery of the location-based message to a destination wireless device. In a further embodiment, a wireless device may periodically transmit the current spatial location of the wireless device to a predetermined destination wireless device. In a further embodiment, a wireless device may be notified when a selected wireless device is within a predetermined proximity.

BRIEF DESCRIPTION OF THE DRAWINGS

The present invention is illustrated by way of example, and not by way of limitation, in the figures of the accompanying drawings and in which.

DETAILED DESCRIPTION

In the following description, for the purposes of explanation, numerous specific details are set forth in order to provide a thorough understanding of the present invention. It will be apparent, however, to one skilled in the art that present invention may be practiced without some of these specific details. In addition, the following description provides examples, and the accompanying drawings show various examples for the purposes of illustration. However, these examples should not be construed in a limiting sense as they are merely intended to provide examples of embodiments of the invention rather than to provide an exhaustive list of all possible implementations. In other instances, well-known structures and devices are shown in block diagram form in order to avoid obscuring the details of the present invention.

In the following description, certain terminology is used to describe features of the invention. For example, the term "logic" is representative of hardware and/or software configured to perform one or more functions. For instance, examples of "hardware" include, but are not limited or restricted to an integrated circuit, a finite state machine or even combinatorial logic. The integrated circuit may take the form of a processor such as a microprocessor, application specific integrated circuit, a digital signal processor, a microcontroller, or the like.

An example of "software" includes executable code in the form of an application, an applet, a routine or even a series of instructions. The software may be stored in any type of computer or machine readable medium such as a programmable electronic circuit, a semiconductor memory device inclusive of volatile memory (e.g., random access memory, etc.) and/or non-volatile memory (e.g., any type of read-only memory "ROM", flash memory), a floppy diskette, an optical disk (e.g., compact disk or digital video disc "DVD"), a hard drive disk, tape, or the like.

A further example of software includes a "software module." A "software module" or "module" is a series of code instructions that, when executed, performs a certain function. Examples of such code include an operating system, an application, an applet, a program or even a subroutine. Software module(s) may be stored in a machine-readable medium, including, but not limited to, an electronic circuit, a semiconductor memory device, a read only memory (ROM), a flash memory, an erasable ROM (EROM), a floppy diskette, a computer disk, an optical disk, a hard disk, a fiber optic medium, a radio frequency (RF) link and the like.

Figure 1:
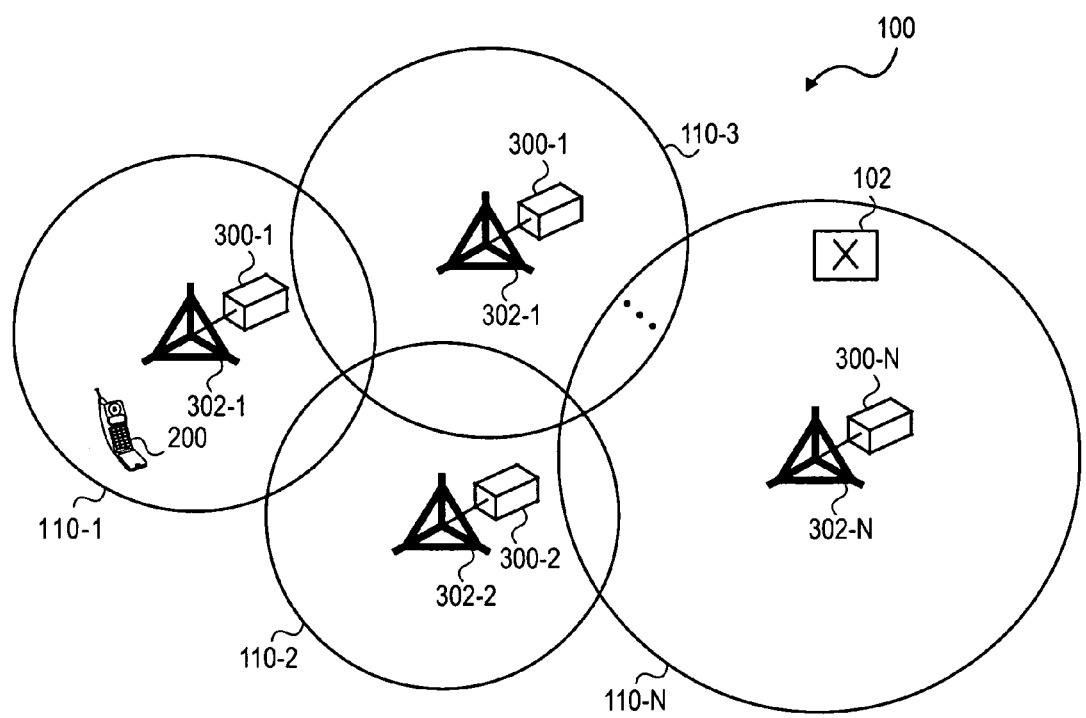
FIG. 1 is a block diagram illustrating a cellular network to provide location-based wireless messaging for wireless devices, in accordance with one embodiment.

FIG. 1 is a block diagram illustrating a cellular network 100 to provide location-based wireless messaging for wireless devices, in accordance with one embodiment. Representatively, cellular network 100 includes a series of cellular antennas 302 (302-1, 302-2, 302-3, . . . , 302-N) with overlapping areas ("cells") 110 (110-1, 110-2, 110-3, . . . , 110-N). In the embodiment illustrated, each cellular antenna 302 is coupled to a base station 300 (300-1, 300-2, 300-3, . . . , 300-N). In one embodiment, a wireless device 200, such as, for example, a cellular phone may desire the receipt of a location-based wireless message. As described herein, a "location-based message" may refer to a message, a text, a voice, video or other like message that a user may record via wireless device 200, which is not delivered until wireless device 200 is at a message delivery location, shown as message delivery location 102 within cell 110-N.

As described herein, the term "wireless device" is used to refer to wireless devices including, but not limited to, personal computers including laptop computers, equipped with wireless adapter cards, as well as personal digital assistants (PDAs), appliances, cellular phones, and other like devices configured to communicate via a wireless communications medium such as, for example, radio frequency (RF) waves. Furthermore, as described herein, the term "base station" is used to refer to devices including, but not limited to, wireless base stations, wireless access points (AP), cell/radio towers, computers such as server computers, personal computers, laptops, PDAs, or like devices configured to restrict access to stored information contained therein or to an attached wired network.

In accordance with one embodiment, a user desiring the receipt of a location-based message issues a location-based message request to wireless device 200. In one embodiment, the location-based message request may include a message delivery location and a destination wireless device. In one embodiment, the destination wireless device is the wireless device 200. In an alternative embodiment, the destination wireless device may be some other selected wireless device or other like communications location to which the user desires the delivery of the location-based message once the wireless device 200 arrives at the message delivery location 102.

Figure 2:
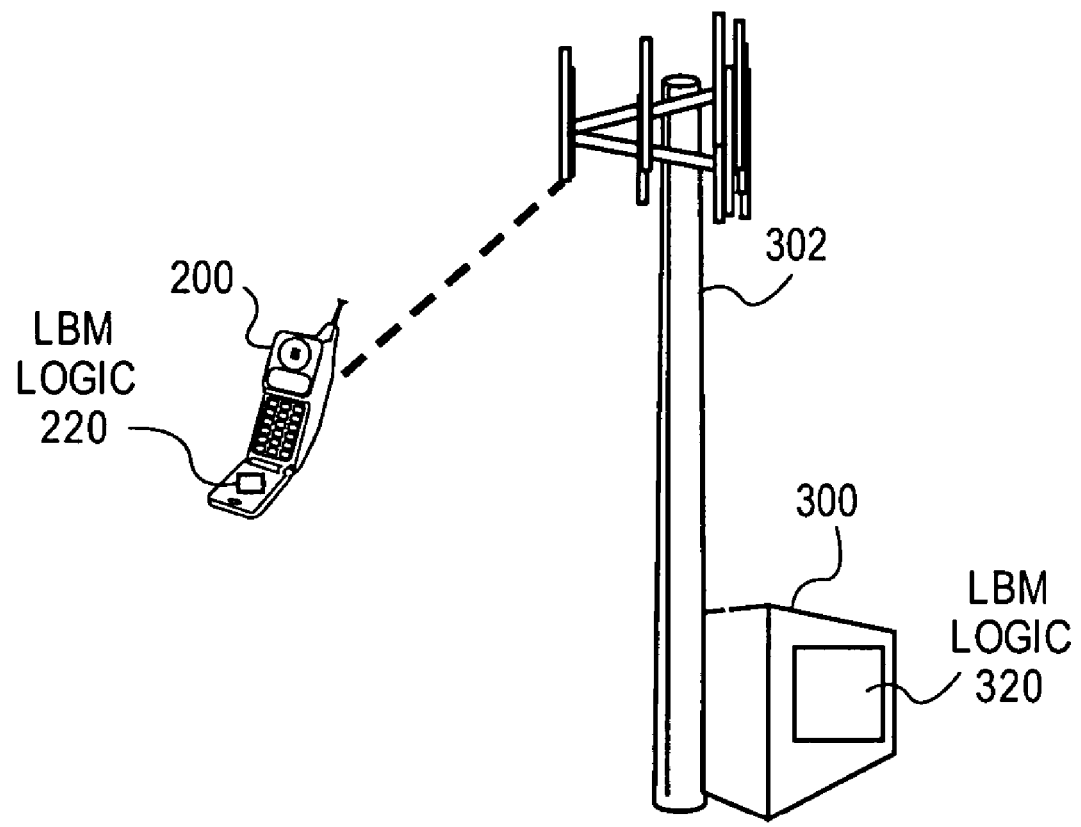
FIG. 2 is a block diagram further illustrating a wireless device and base station, as shown in FIG. 1, in accordance with one embodiment.

FIG. 2 further illustrates wireless device 200 and base station 300, including location-based message (LBM) logic 220/320, in accordance with one embodiment. In the embodiments described in further detail below, LBM logic 220 of wireless device 200 monitors a current spatial location of the wireless device. In accordance with such an embodiment, wireless device 200 may include a global positioning system (GPS) receiver to receive GPS coordinates regarding a current spatial location of the wireless device. In one embodiment, LBM logic 220 of wireless device 200 may identify a current spatial location of the wireless device based on a location name broadcast by cellular antenna 302.

In one embodiment, the determination of a location based on a location named broadcast by a closest cellular tower provides less spatial resolution than GPS coordinates provided by a GPS receiver. In a further embodiment, LBM logic 220 of wireless device 200 may identify a current spatial location of the wireless device using, for example, triangulation based on the three closest cellular towers. In accordance with such embodiment, the distance estimate via triangulation is computed locally at the wireless device or may be computed remotely by cellular infrastructure and transmitted to wireless device 200.

Figure 3:
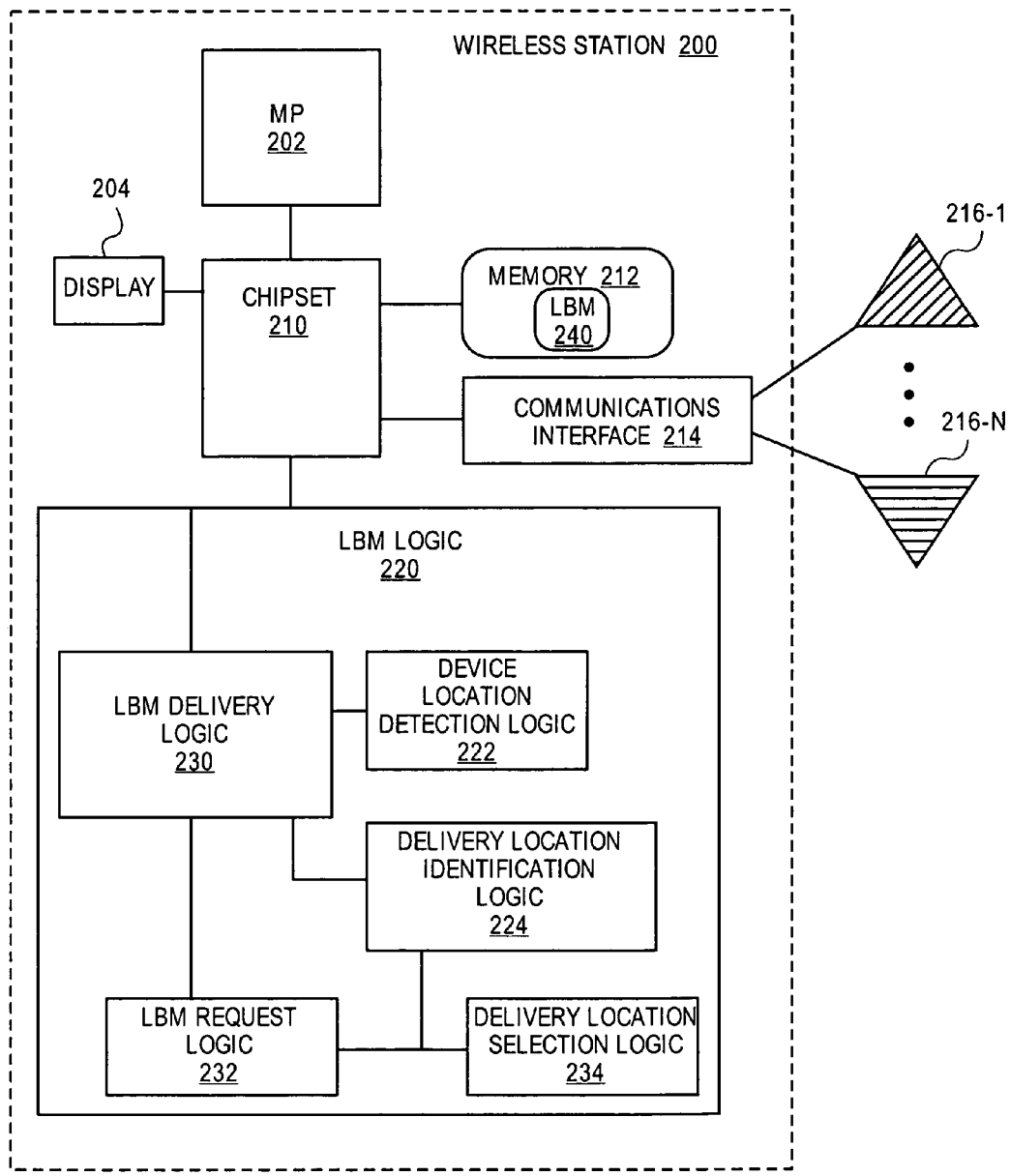
FIG. 3 is a block diagram further illustrating the wireless device, as shown in FIGS. 1 and 2, in accordance with one embodiment.

FIG. 3 is a block diagram further illustrating wireless device 200 to provide location-based wireless messaging, in accordance with one embodiment. Representatively, wireless device 200 may include a microprocessor 202, which uses a chipset 210 to access memory 212, display 204, as well as communications interface 214. As described herein, the term "chipset" is used in a manner to collectively describe the various devices coupled to microprocessor (MP) 202 to perform desired system functionality. Representatively, communications interface 214 may include a plurality of incoming and outgoing antennas 216 (216-1, . . . , 216-N). In contrast to conventional wireless devices, wireless device 200 includes location-based wireless messaging (LBM) logic 220.

In the embodiment illustrated, LBM logic 220 includes LBM delivery logic 230. In one embodiment, LBM delivery logic 230 is provided to determine whether a current spatial location of a wireless device may be identified as a message delivery location, in accordance with one embodiment. To perform such functionality, LBM delivery logic 230 uses device location detection logic 220 to determine a current spatial location of the wireless device. In one embodiment, device location detection logic 222 monitors a spatial location of the wireless device. LBM logic 230 also utilizes delivery location identification logic 224.

In one embodiment, delivery location identification logic 224 may determine whether a current spatial location of the wireless device is identified as the message delivery location. When such is detected, delivery location identification logic 224 may notify LBM delivery logic 230 that wireless device 200 is currently located at the message delivery location. For example, as shown in FIG. 1, once wireless device 200 reaches message delivery location 102, delivery location identification logic 224 may notify LBM delivery logic 230. In accordance with such an embodiment, a location-based message or LBM 240, for example, as stored in memory 212, may be delivered to a user of wireless device 200 via, for example, display 204.

As further illustrated in FIG. 3, LBM logic 220 further includes LBM request logic 232 to enable a user to request an LBM message, in accordance with one embodiment. Representatively, LBM request logic 232 includes delivery location selection logic 234 to allow a user to select a message delivery location. In the embodiments described, the message delivery location may be selected from one or more previously utilized message delivery locations. Otherwise, the delivery location selection logic 224 may enable a user to enter GPS coordinates, a name or address, or a location type, such as, for example, a shopping center, supermarket or other like location.

As shown in FIG. 3, delivery location selection logic 234 enables a user to provide a message delivery location. However, the user cannot reasonably be expected to know, for example, the exact coordinates of the message delivery location or the exact name indicated by a wireless beacon at a message delivery location. Accordingly, in one embodiment, the user is provided with the option to enable delivery of a location-based message whenever the recipient is in a general type of location, such as, for example, a store. In accordance with such an embodiment, the wireless device will then delivery the location-based message when it determines itself to be at a store or near a store, either based on a broadcast location name, a GPS look-up directory (usually provided by the cellular provider or via the Internet), or other like means for identifying whether a location type of a current spatial location of the wireless device matches a location type of a message delivery location.

In a further embodiment, a user may specify the name of a message delivery location based on, for example, a name/address of the message delivery location. In accordance with such an embodiment, delivery location selection logic may use a namedirectory-to-GPSCoordinatelookup, for example, as provided by the cellular phone company to determine the GPS coordinates of the message delivery location and also send such information to the wireless device. In accordance with such an embodiment, the wireless device may determine the location based on either the name/address or GPS coordinates.

In one embodiment, for future messages from the same sender, a most recently used list of the locations is provided by delivery location selection logic 234 to expedite the selection of a message delivery location by a user. In one embodiment, an additional feature would specify delivery based on time instead of location or in addition to location. Initially, the relationship between location and name of location may also be formed by the user "teaching" the device the names to associate in the future with the present location, when the user is at each different location. For example, when the user is at the supermarket, the user types "location name: supermarket" into the cell phone. The cell phone then records, for its own future reference, the name "supermarket" with location information it can obtain either via GPS, triangulation from cellphone towers, etc. In one embodiment, the user may via a list of location-based messages already queued and waiting for delivery to the user when the user gets to one or more future locations.

Accordingly, in one embodiment, as described herein, a location type enables the delivery of a location-based message request whenever a location type of a current spatial location of the wireless device matches a location type of a message delivery location specified by the user as part of the LBM message request. In the embodiments described, device location detection logic 222 may include a GPS receiver (not shown) to receive GPS coordinates identifying a current spatial location of wireless device 200. In a further embodiment, wireless device 200 may compute a current spatial location according to a location name broadcast by a closest base station. In a further embodiment, location detection logic 222 may determine a current spatial location of the wireless device according to triangulation based on three closest base stations.

As an example, an additional feature would direct the user's wireless device to automatically send a message to someone else, referred to herein as a "destination wireless device," whenever the user's cell phone reaches a location. For example, a user's wireless device may be programmed to send a selected individual a text/voice message whenever the user reaches a message delivery location. For example, the user may program the wireless device to issue a location-based message to a wife of the user whenever the user, for example, reaches a home shared by the user and his wife. Another option allows the user's wireless device to periodically transmit a location of the wireless device, which may be useful for parents who are concerned regarding the location of their children who have cell phones and would like to receive frequent location updates, possibly with GPS coordinates superimposed on a map. As will be recognized, other options are possible, for example, for automated tracking of delivery, personal pets, etc., or the like.

Figure 4:
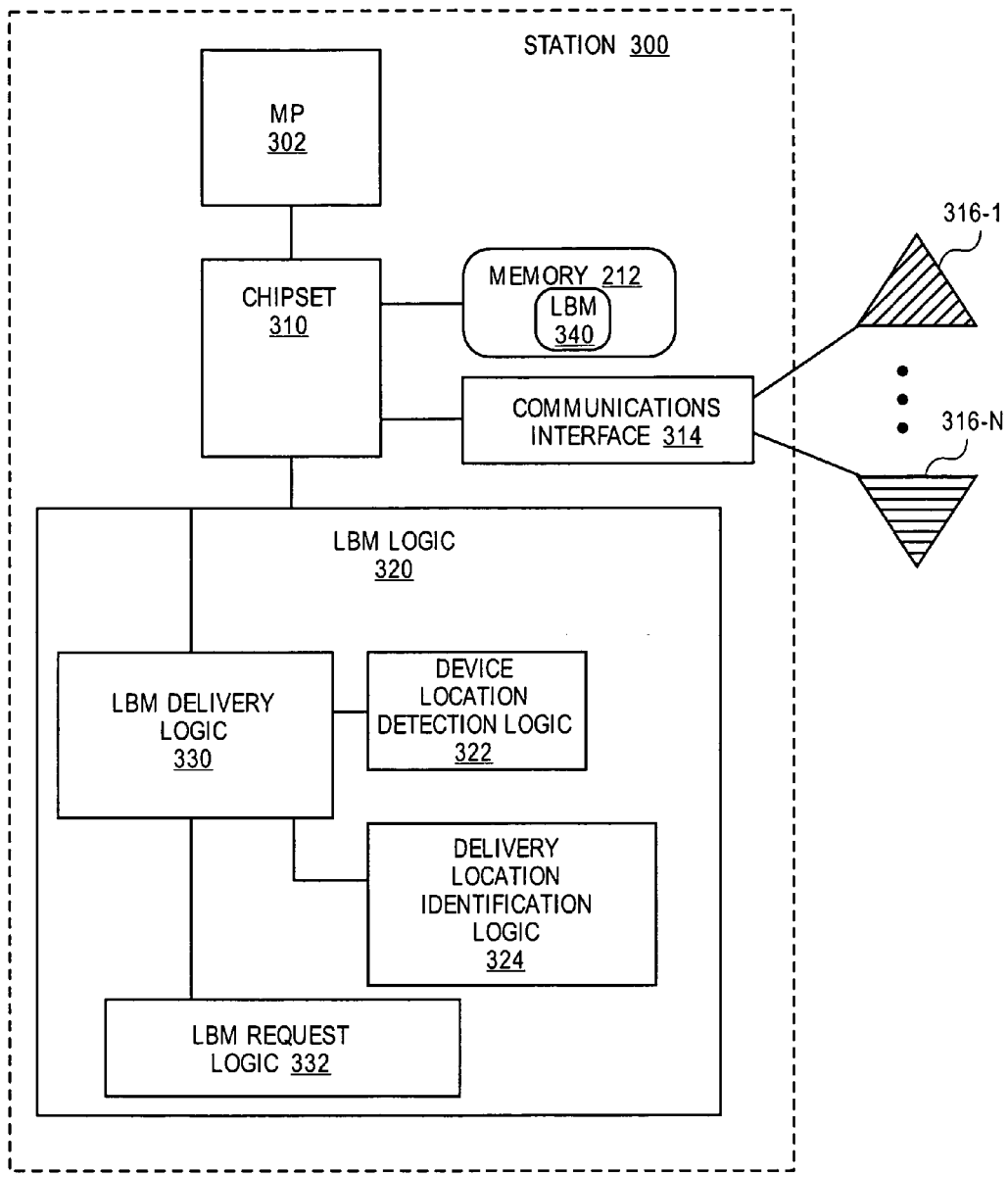
FIG. 4 is a block diagram further illustrating the base station, as shown in FIGS. 1 and 2, in accordance with one embodiment.

FIG. 4 is a block diagram further illustrating base station 300, as shown in FIGS. 1 and 2. In the embodiment illustrated, base station 300 is modified to perform the location-based message delivery functions of LBM logic 220, as shown in FIG. 3, in accordance with one embodiment. Accordingly, in the embodiment illustrated in FIG. 4, LBM logic 320 is incorporated within the base station, such that the wireless device 200 is not responsible for identifying the current spatial location of the wireless device and may be merely notified by the LBM logic 320 when the wireless device has reached the message delivery location.

In accordance with one embodiment, once the wireless device reaches the message delivery location, LBM delivery logic 330 will issue LBM 340, as stored in memory 312, to wireless device 200. Accordingly, in device location detection logic 322 is responsible for monitoring the current spatial location of the wireless device, whereas delivery location identification logic 324 is provided to determine whether a current spatial location of the wireless device is determined by device location detection logic 322 matches a message delivery location according to a received location-based message request by LBM request logic 332.

In one embodiment, message delivery location identification logic 324 requires inputting of one or more values to define coordinate boundaries of a message delivery location. For example, as illustrated with reference to FIG. 1, a wireless network 100 is configured. In one embodiment, a user would be required to provide, for example, geographic coordinates identifying the coordinate boundaries of the message delivery location. In one embodiment, providing of the boundaries can simply be performed by providing a remote control device (not shown) for base station 400 which a user can carry along the boundaries of their home or other like message delivery location, which are recorded by the remote control.

In one embodiment, the coordinates may either be wirelessly transmitted to message delivery location identification logic 324 or, for example, downloaded into identification logic 324 from the remote control once docked onto station 300. In an alternative embodiment, a geographic positioning system could be used to identify the coordinate boundaries of message delivery location 102 and provide the boundaries to identification logic 324. Based on this information, identification logic 324 generates an internal representation of the home or structure. The parameters used to form the internal representation of the wireless network may vary depending on the desired implementation which may include, for example, geographic coordinate systems, latitude and longitude readings, and the like.

In addition to the internal representation of the message delivery location, in one embodiment, identification logic 324 stores data based on characteristics from a sample wireless device signal such as, for example, the estimated direction of arrival (DOA), signal strengths, and characteristics (space-time features) of multipath signals received from the wireless message delivery location device. In such an embodiment, data is transmitted to the station 300 from a wireless device located at a few locations within the geographic boundaries of the message delivery location and from a few locations outside the geographic boundaries of the message delivery location. This information may be used to assist the client location detection logic 322 to convert detected signal characteristics from a wireless device requesting a location-based message to determine whether the wireless device is located within the coordinate boundaries of the message delivery location.

In a further embodiment, this information can be used to perform multipath fingerprinting of wireless devices. In one embodiment, the multipath fingerprints may be stored within, for example, a database (not shown) which may be configured to adapt over time as multipath fingerprints changes over time. In a further embodiment, multiple stations may be utilized within the wireless network, which may each perform the various techniques described above for enabling analysis of the RF signal received from a wireless device, base station, wireless access points or the like, and convert characteristics of the received signal into, for example, geographic coordinates, the geographic coordinates are then compared with the internal representation of the coordinate boundaries of the message delivery location.

In one embodiment, identifying of the wireless device's location may be performed utilizing a trusted global positioning system (GPS). In an alternative embodiment, characteristics of the radio frequency waves used to transmit/receive information from the wireless devices to the station may be analyzed. For example, in one embodiment, device location detect logic 322 may generate a model of the multipath propagation effect, as well as the RF propagation effect according to the radio frequency waves used to provide the location-based message request to the station 300. According to the multipath and RF propagation estimates, location detection logic 322 can determine an approximate location of the wireless device.

In a further embodiment, base station 300 may be equipped with direction of arrival estimation logic, such as adaptive antenna arrays. For example, in one embodiment, beam forming adaptive antenna arrays may be used to determine the direction of arrival from the signal received from the wireless device, and can also be used to estimate the distance of the wireless device. Based on this information, an approximate location of the wireless device is determined. In a further embodiment, information such as the direction of the wireless device may be used to transmit directionally from base station 300 to the wireless devices, hence decreasing the possibility of interception from rogue clients.

Figure 5:
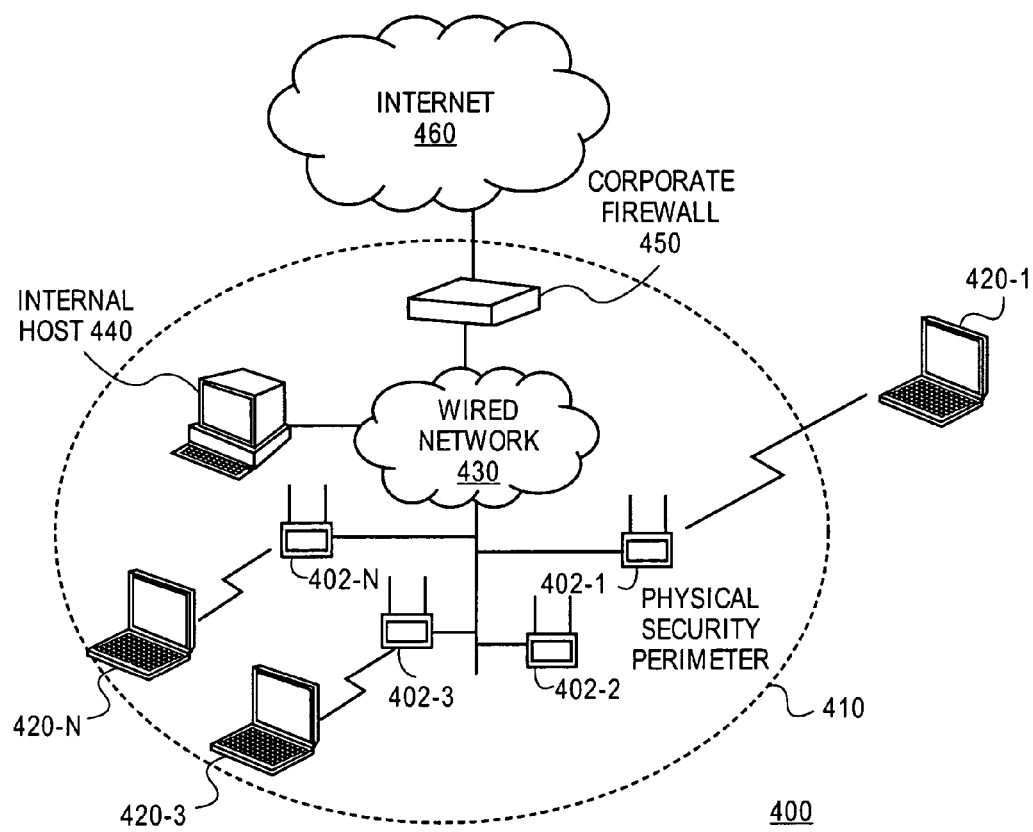
FIG. 5 is a block diagram illustrating location-based wireless messaging within a wireless network, in accordance with one embodiment.

In the embodiments described above, location-based wireless messaging is described with reference to wireless networks; specifically, to cellular networks. However, it should be recognized that the embodiments described herein may be applied beyond cellular networks and can be applied to any wireless network to provide location-based wireless messaging to wireless devices. In one embodiment, as shown in FIG. 5, wireless network 400 is configured according to the IEEE 802.11 standard, also referred to as infrastructure mode or basic service set (BSS). Conversely, within the ad hoc mode (peer-to-peer wireless configuration) only the wireless devices within the transmission range (within the same cell) can communicate with each other.

The Institute of Electrical and Electronic Engineers (IEEE) 802.11 Standard (e.g., IEEE Std. 802.11-1997, 802.11a, 802.11.e, 802.11 n, etc.) specify technologies for wireless networks. There are several technologies for wireless networks, including the 802.11 standard, HiperLan2, wireless fidelity (Wi-Fi), as well as the worldwide interoperability for microwave access (WiMax). Wi-Fi is a trademark for sets of product compatibility standards for wireless local area networks (WLANS). WiMax is based on a standard provided by IEEE 802.16 specializing in point-to-multipoint broadband wireless access. WiMAX is generally a wireless metropolitan area (MAN) technology that can connect Wi-Fi hotspots, for example, with each other to other parts of the Internet and provide a wireless alternative to cable and DSL (digital subscriber line). In the embodiments described herein, the location-based wireless messaging can be applied to all such wireless networks, including Wi-Fi based networks, WiMax networks, 802.11 standard networks, HiperLan2 networks, cellular networks or other like wireless networks.

Representatively, wireless network 400 includes a plurality of wireless devices 420 (420-1, 420-2, 420-3, . . . , 420-N), which access wireless network 400 via access points 410 (410-1, 410-2, 410-3, . . . , 210-N) for access to wired network 430, which is coupled to internal host 440. As further illustrated in FIG. 5, wireless network 200 includes corporate firewall 450, which is coupled to Internet, or wide area network 460. Accordingly, in the embodiments described, location-based wireless messaging may be implemented within wireless networks including cellular networks, wireless local area networks (WLAN), wireless personal area networks (WPAN), wireless metropolitan area networks (WMAN), which may be provided by ultrawide bandwidth (UWB) radio systems, Wi-Fi wireless networks, WiMax networks 802.11 standard network, Hiperlan2 networks or other like wireless networks Accordingly, in the embodiment illustrated in FIG. 5, identification of a current spatial location of a wireless device can be triangulated using, for example, Wi-Fi access points 210 or the name of the location can be determined from, for example, an SSID (service set identifier) name (which can be the location name) using the beacon transmitted by Wi-Fi access point 210. Wi-Fi triangulation and location determination can be used indoors as well to determine locations to within different rooms in a building as possible message delivery locations.

Figure 6:
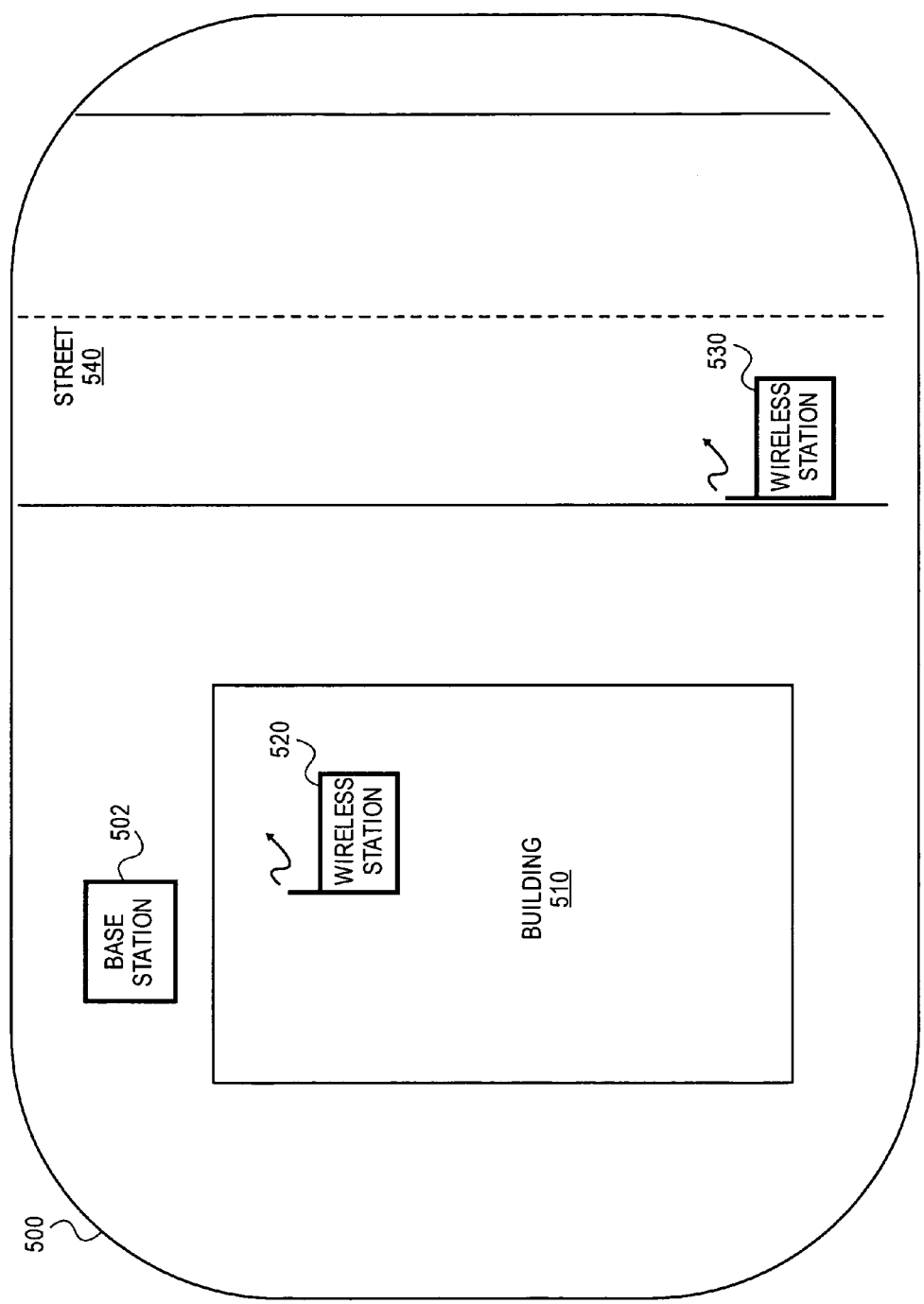
FIG. 6 is a block diagram illustrating location-based wireless messaging according to a proximity of one or more wireless devices, in accordance with one embodiment.

FIG. 6 is a block diagram illustrating an embodiment, referred to herein as the "notification circle location-based message". Representatively, wireless station 520 and 530 may have a pre-agreed upon notification circle LBM agreement. In accordance with such an agreement, in one embodiment, a user of a wireless device may request notification as to whether a specific person (presumably a friend) is part of a notification circle.

In accordance with one embodiment, if the friend's wireless device 530 is detected within a predetermined proximity, such as, for example, 50 yards of the user's wireless device 520, the user is notified regarding the proximity of the friend, which is located on street 540. For example, as shown in FIG. 6, when wireless device 530 is within a predetermined proximity, such as 50 yards from building 510, in which wireless device 520 is located, wireless station 520 may be notified of the proximity of the friend, which is part of a notification circle, in accordance with one embodiment. In one embodiment, base station 502 monitors the spatial location of wireless stations 520 and 530 and issues the notification to wireless station 520.

As will be recognized by those skilled in the art, the mechanism used to identify the location of a wireless device will depend on the model used to supplement the internal representation of the coordinate boundaries of the message delivery location. In one embodiment, multipath fingerprinting can be used to estimate the location of devices. For example, when an LBM request is received from a wireless device, pattern matching may be used to estimate the location of the wireless device based on multipath characteristics of the received signal. Accordingly, in one embodiment, if the exact location of matching multipath characteristics is stored in a database, the location of the wireless device may be estimated with nearly one hundred percent accuracy.

In a further embodiment, a direction arrival, signal strength, and characteristics of spatio-temporal features of multipath signals received from the wireless device or by the wireless device may be compared against previously stored values in order to approximate the spatial location of the wireless device. In a further embodiment, a wireless network may utilize multiple stations. When using multiple stations, in one embodiment, the location of a wireless device may be performed using triangulation. In a further embodiment, a probabilistic approach can be used to help increase the accuracy of location estimation.

For example, as described above, estimates from wireless devices located within and outside the coordinate boundaries of a message delivery location may be analyzed using Euclidean Distance Estimation or Neural Network Estimation methods. For Euclidean Distance, the distance between the newly measured vector and stored vectors is minimized to yield the best estimation of the wireless device location. Furthermore, estimation location may be improved by determining a direct distance to a wireless device. This may be estimated by signal strengths, as well as measuring round trip times of a packet sent from the station to the wireless device.

For example, a packet is sent to the device after response or acknowledgement is received within a certain period of time the client is assumed to be within a certain distance of the station taking into account propagation times. Within some types of UWB systems, the round-trip time for communication of the packet can be used to provide distance estimation due to the decrease or absence of multipath fading in UWB systems.

As such, once either a GPS provided location or an approximate location for the wireless device is determined, the location is compared to the internal representation of the coordinate boundaries of the message delivery location contained within identification logic 324. Consequently, when the identified spatial location of the wireless device falls within the coordinate boundaries of the message delivery location, LBM delivery logic 320 may communicate LBM 340 to wireless device.

Accordingly, as described in the embodiments, the spatial location of devices may be determined by the various methods described above, such as by GPS devices on the wireless devices or other methods, such as the 802.11 standard, HiperLan, Wi-Fi, WiMax or UWB based positioning. In one embodiment, location-based wireless messaging is implemented in the form of hardware and software in the wireless devices. Multiple base stations may also combine information each has obtained to obtain a more accurate estimate of device location. Conversely, identifying the spatial location of a wireless device may be determined by a base station based on characteristics of signals received from the wireless device. Accordingly, location-based wireless messaging may be based on absolute or relative location of wireless devices in accordance with one embodiment. Procedural methods for implementing one or more embodiments are now described.

Operation

Figure 7:
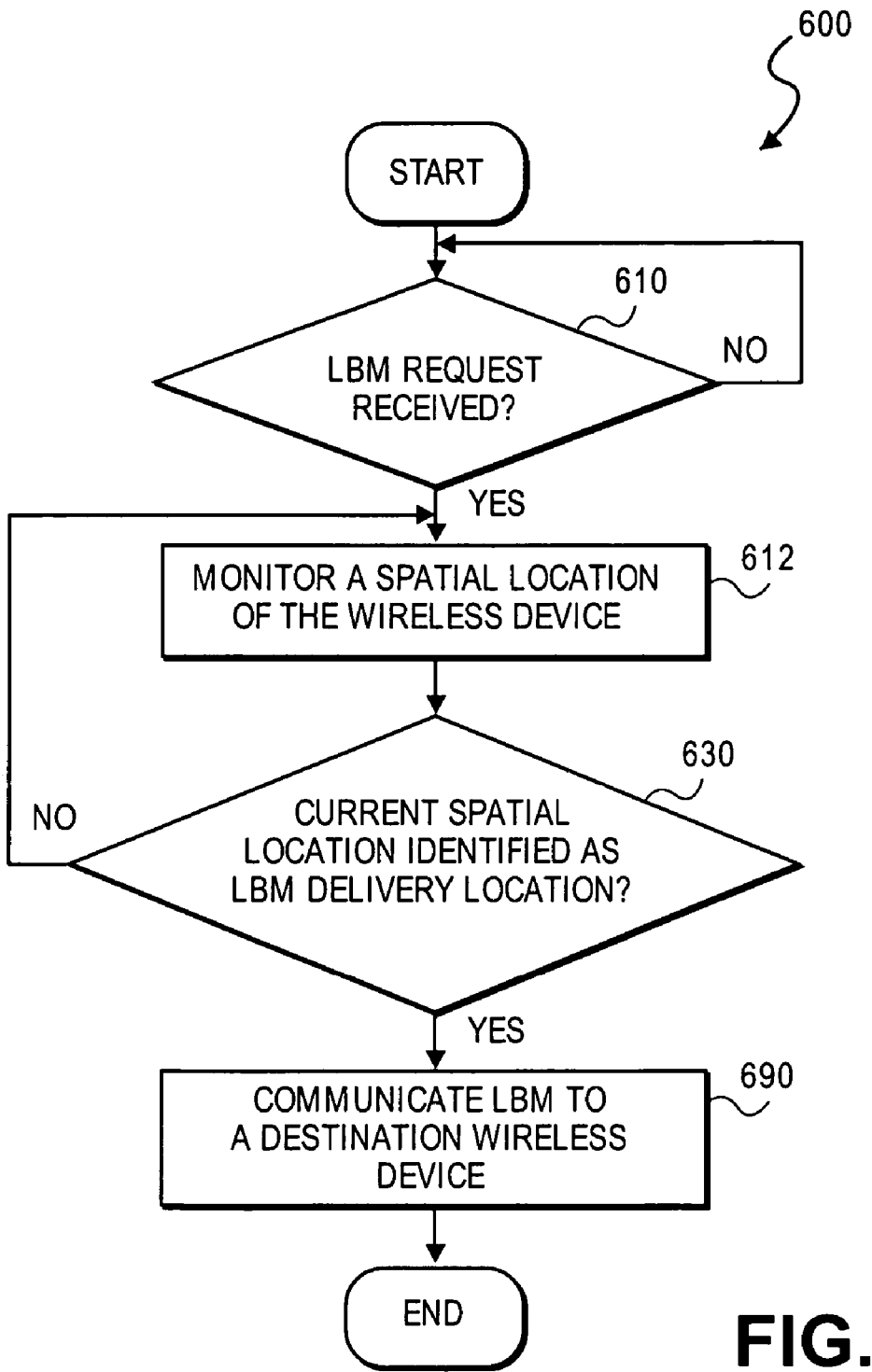
FIG. 7 is a flowchart illustrating a method for location-based wireless messaging, in accordance with one embodiment.

Turning now to FIG. 7, the particular methods associated with various embodiments are described in terms of computer software and hardware with reference to a flowchart. The methods to be performed by a computing device (e.g., a wireless device) may constitute state machines or computer programs made up of computer-executable instructions. The computer-executable instructions may be written in a computer program and programming language or embodied in firmware logic. If written in a programming language conforming to a recognized standard, such instructions can be executed in a variety of hardware platforms and for interface to a variety of operating systems.

In addition, embodiments are not described with reference to any particular programming language. It will be appreciated that a variety of programming languages may be used to implement embodiments as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 7 is a flowchart illustrating a method 600 of location-based wireless messaging for wireless devices in accordance with one embodiment. For example, the location-based wireless messaging may be performed within a wireless network, for example, as depicted in FIG. 2, utilizing a base station as described in FIG. 4, in accordance with one embodiment. In the embodiments described, examples of the described embodiments will be made with reference to FIGS. 1-6. However, the described embodiments should not be limited to the examples provided to limit the scope provided by the appended claims.

Referring again to FIG. 7, at process block 610, it is determined whether or not a location-based message request is received. For example, as illustrated with reference to FIG. 1, station 300-1 would determine whether, for example, a location-based message request is received from a wireless device that is requesting the set-up of a location-based message according to a message delivery location. For example, as illustrated with reference to FIG. 1, the wireless device 200 could issue a location-based message request for receipt of a location-based message or message delivery location.

In response, at process block 610, a spatial location of the wireless device is monitored. Once monitoring of the wireless device is initiated by process block 612, at process block 630 it is determined whether a current spatial location of the wireless device is identified as the location-based message (LBM) delivery location. As described above, various mechanisms exist for providing such identification, which may be included as logic within either the wireless device or performed by the base station or wireless access points of a wired network.

Accordingly, at process block 690, when the wireless device is identified as having reached the message delivery location, at process block 690, the location-based message is communicated to a destination wireless device according to the location-based message request. In the embodiments described herein, the destination wireless device may simply be the wireless device of the user. However, in alternative embodiments, the user may select the delivery of the location-based message to other individuals, such as, for example, a wife of the user when the user has reached home.

Figure 8:
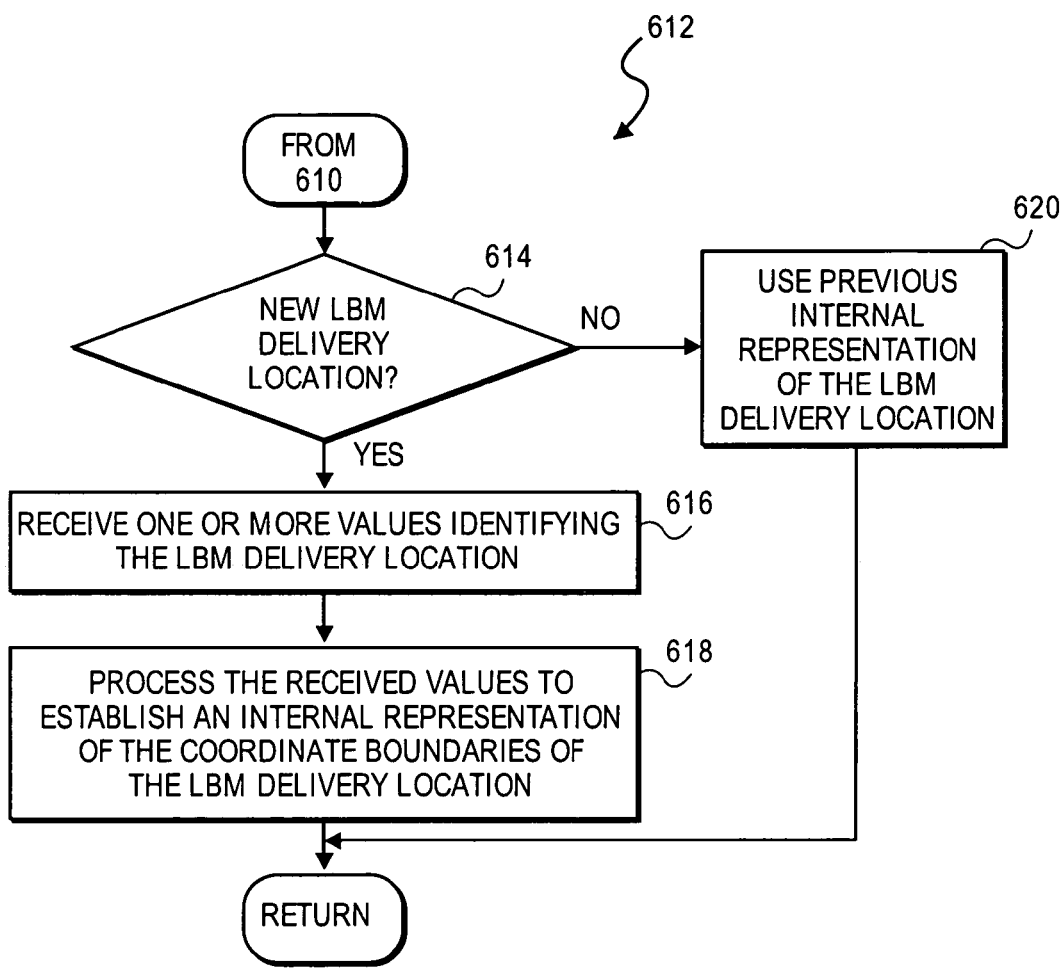
FIG. 8 is a flowchart illustrating a method for establishing an internal representation of a location-based message delivery location, in accordance with one embodiment.

FIG. 8 is a flowchart illustrating a method 612 for establishing an internal representation of a message delivery location, in accordance with one embodiment. At process block 614, a new message delivery location is received. Once received, at process block 616, one or more values message delivery location are received. Once the values are received, at process block 618, the received values are processed to establish an internal representation of the message delivery location.

For example, in one embodiment, geographic coordinates, longitude and latitude readings, or the like are used to establish an internal representation of the message delivery location within, for example, a base station 300, as depicted in FIG. 4. In one embodiment, the internal representation of the boundaries is used to compare identified spatial locations of wireless devices either relative to the message delivery location or as indicated by precise or approximate coordinate location.

Figure 9:
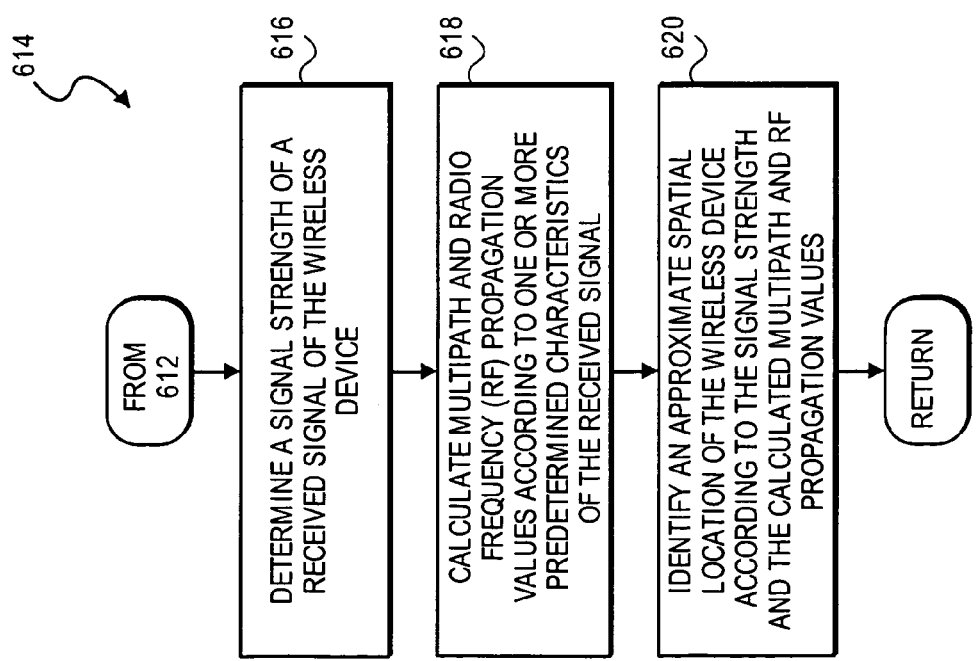
FIG. 9 is a flowchart illustrating a method for identifying an approximate spatial location of a wireless device, in accordance with one embodiment.

Referring now to FIG. 9, a flowchart illustrating a method 614 for identifying the spatial location of a wireless device, in accordance with one embodiment. At process block 616 a signal strength of a signal received from by the wireless device is determined. Once the signal strength is determined, at process block 618, multipath and radio frequency (RF) propagation values are calculated according to one or more predetermined characteristics of the received signal. In one embodiment, the predetermined characteristics may include direction of arrival, spatial temporal properties, such as multipath delay in the scattering environment, and the like.

At process block 620, an approximate spatial location of the wireless device is identified according to the signal strength and the calculated multipath and radio frequency (RF) propagation values. Alternatively, multipath fingerprinting, pattern matching, direction of arrival and distance estimation, triangulation, or the like, may be used to identify the spatial location. In one embodiment, the spatial location is provided relative to the boundaries of the message delivery location. In an alternate embodiment, an approximate coordinate location of the wireless device is identified. In one embodiment, an exact coordinate location of the wireless device may be provided using a geographic positioning system (GPS).

Figure 10:
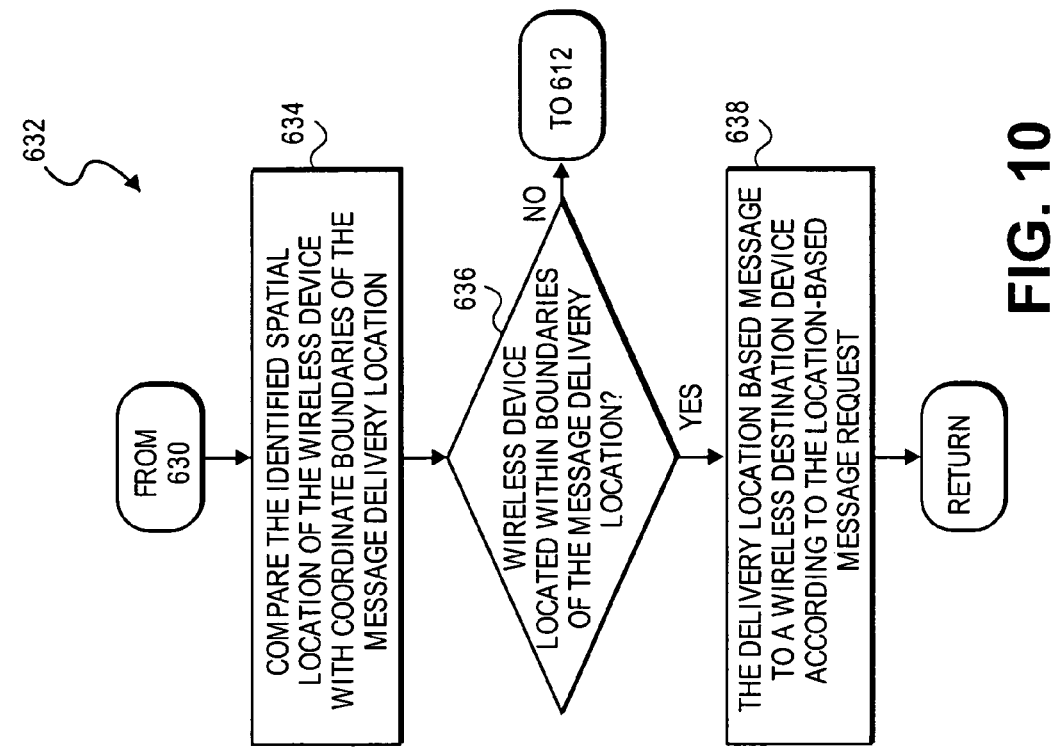
FIG. 10 is a flowchart illustrating a method for determining whether a wireless device has arrived at a message delivery location, in accordance with one embodiment.

FIG. 10 is a flowchart illustrating a method 632 for location-based wireless messaging for a wireless device according to an identified spatial location of the wireless device, in accordance with one embodiment of the invention. At process block 634, a current spatial location of the wireless device is compared with coordinate boundaries of the message delivery location. At process block 636, it is determined whether the wireless device is physically located within the coordinate boundaries of the message delivery location. When the wireless device is physically located within the coordinate boundaries of the message delivery location at process block 638, a location-based message is delivered to a destination wireless device according to the location-based message request. However, if the wireless device is not located within the coordinate boundaries of the message delivery location, control flow branches to process block 612 of FIG. 7 to continue monitoring of the spatial location of the wireless device.

Figure 11:
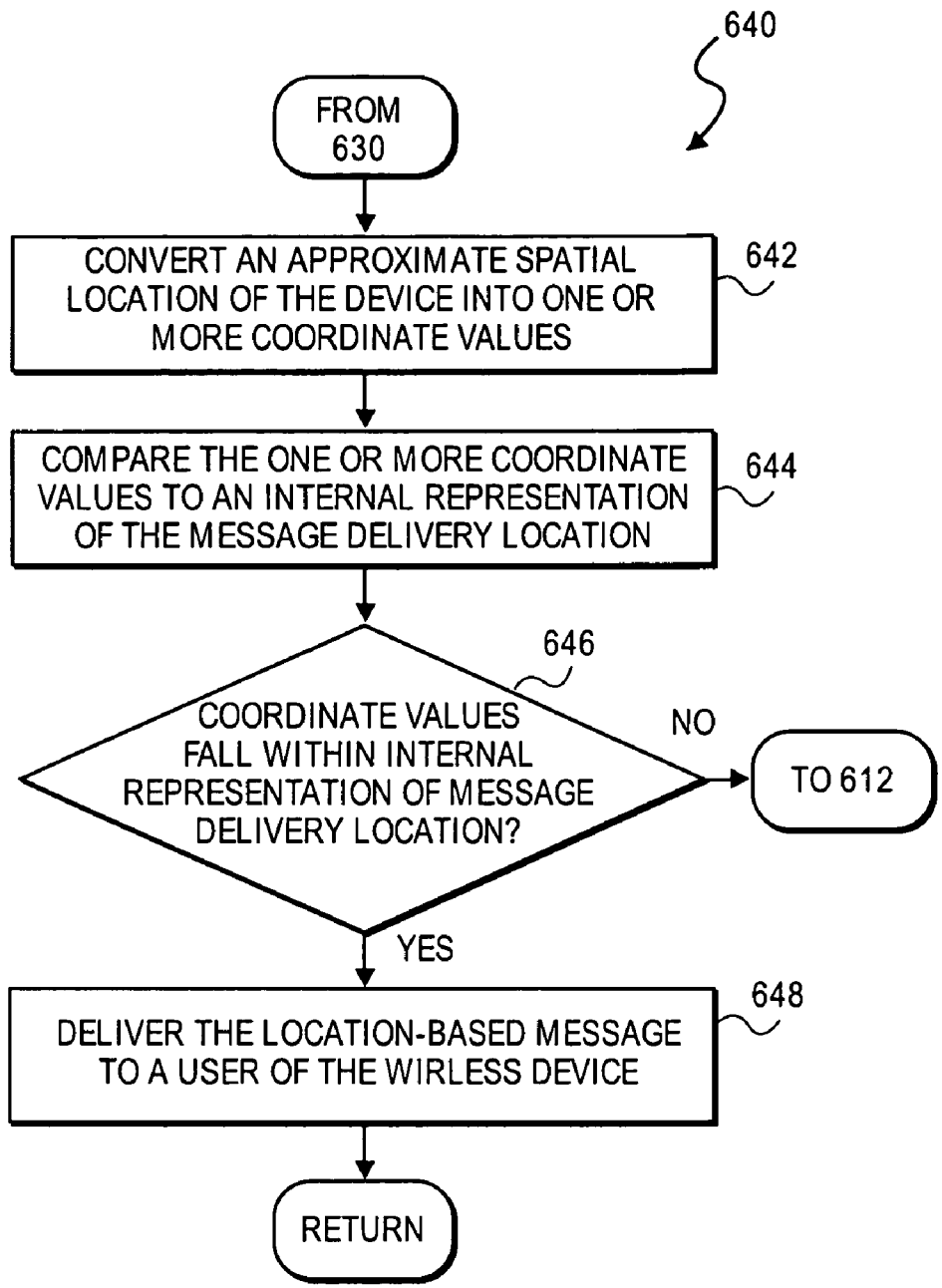
FIG. 11 is a flowchart illustrating a method for determining whether a wireless device has reached a message delivery location, in accordance with one embodiment.

FIG. 11 is a flowchart illustrating a method 640 for location-based wireless messaging for a wireless device according to a current spatial location, in accordance with one embodiment of the invention. At process block 642 an approximate spatial location of the wireless device is converted into one or more coordinate values. At process block 644, the one or more coordinate values are compared to an internal representation of the coordinate boundaries of the message delivery location. Based on the comparison, at process block 646, it is determined whether the coordinate values fall within the internal representation of the coordinate boundaries of the message delivery location. When the values fall within coordinates of the message delivery location, process block 648 is performed. Otherwise, control flow branches to process block 612 of FIG. 7 for continued monitoring of the spatial location of the wireless device. At process block 648, the location-based message is delivered to a user of the wireless device.

Figure 12:
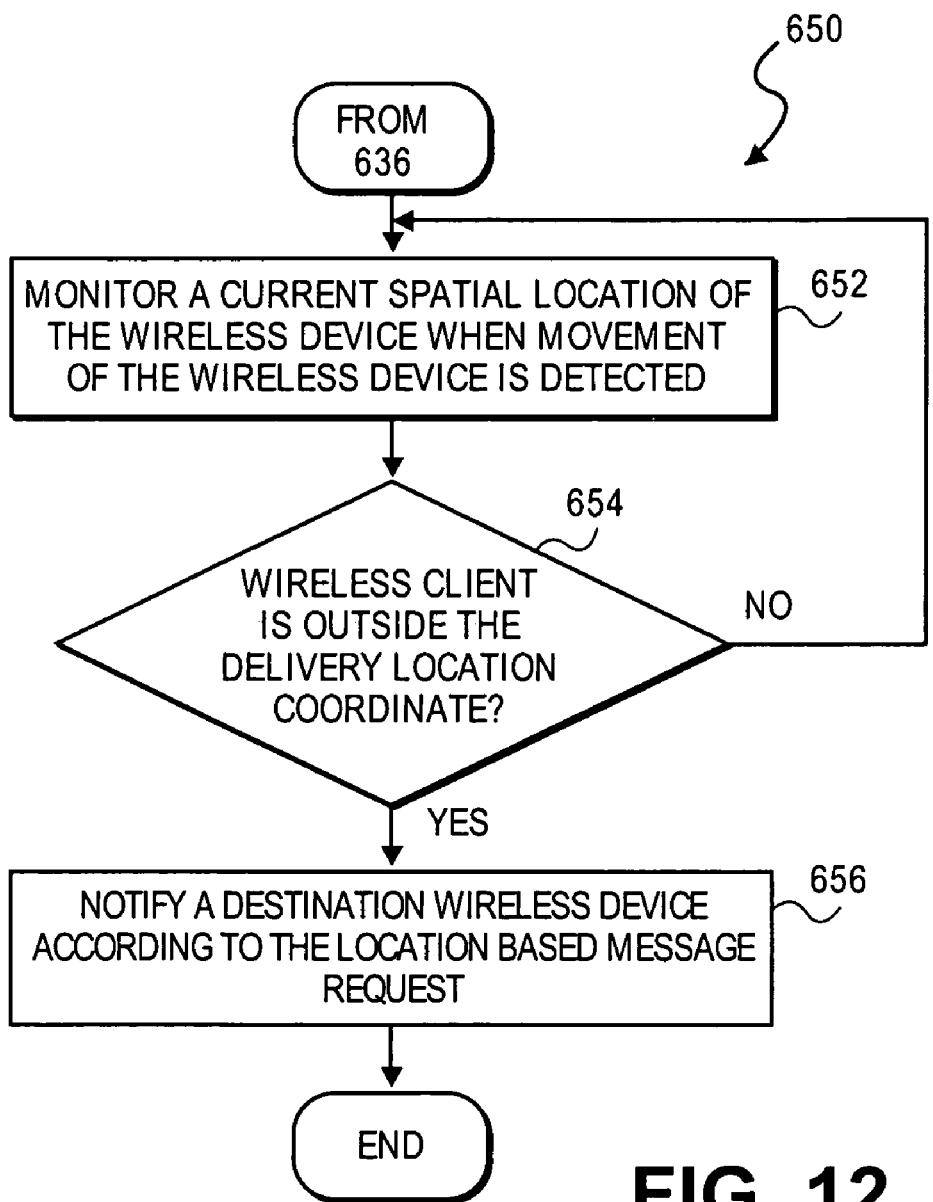
FIG. 12 is a block diagram illustrating a method for notification of a destination wireless device once a wireless device leaves a message delivery location, in accordance with one embodiment.

FIG. 12 is a flowchart illustrating a method 650 for performing location-based wireless messaging for wireless devices, in accordance with one embodiment of the invention. At process block 652 a current spatial location of a wireless device is monitored. In other words, in one embodiment, movement of a wireless device will cause monitoring of the current spatial location of the wireless device. At process block 654, it is determined whether the wireless device is located outside the message delivery location coordinate boundaries.

A destination wireless device is notified according to the location-based message request if the wireless device is located outside the message delivery location. In accordance with such an embodiment, additional tracking of the wireless device is performed to determine whether a device has reached a message delivery location and once such device has reached the message delivery location, whether such wireless device is now moved outside of the message delivery location for additional processing.

Figure 13:
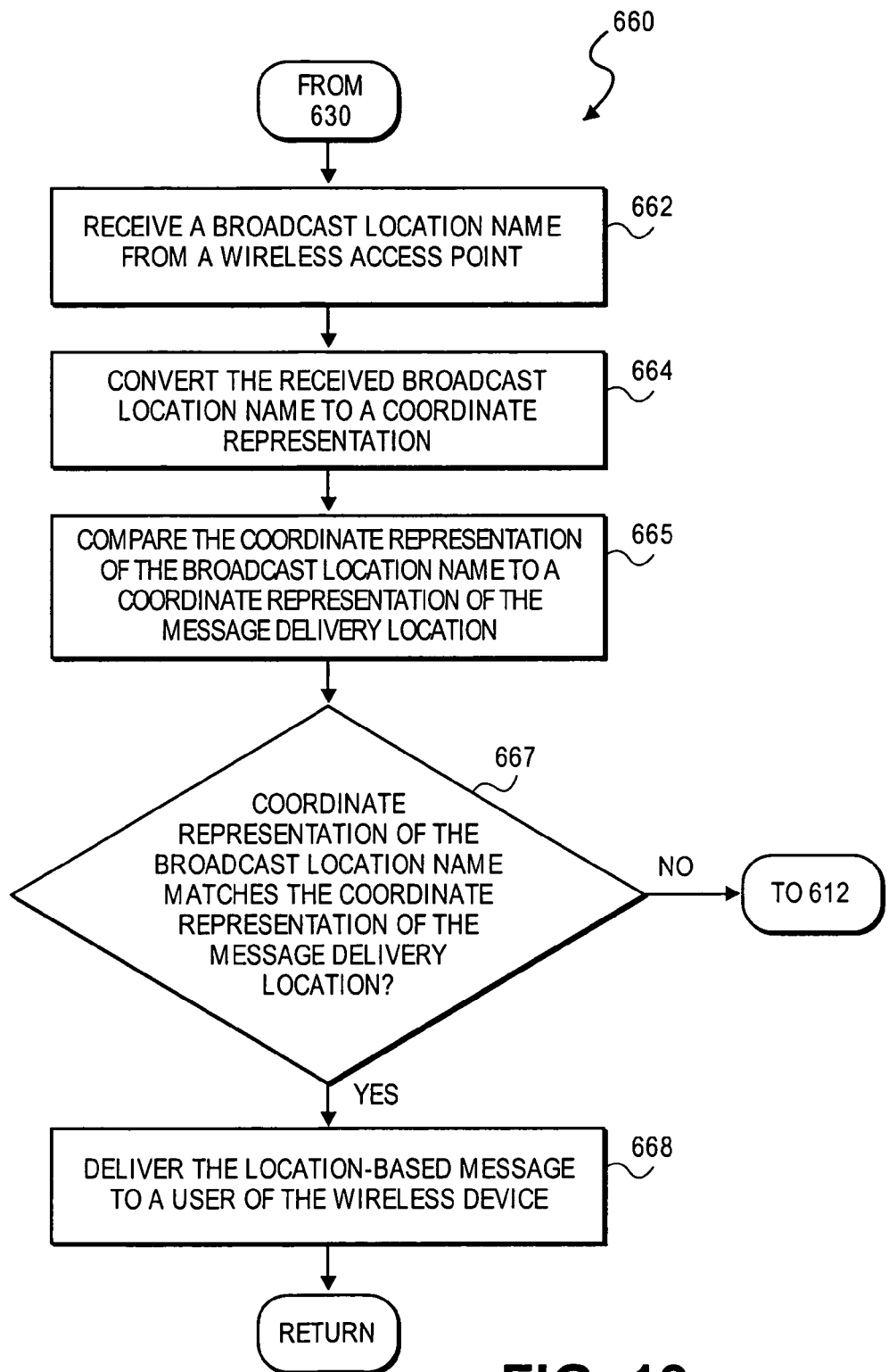
FIG. 13 is a flowchart illustrating a method for enabling a wireless device to determine whether the wireless device has reached the message delivery location according to a received broadcast location name, in accordance with one embodiment.

FIG. 13 is a flowchart illustrating a method 660 for determining whether a wireless device has arrived at a message delivery location, in accordance with one embodiment. Once received, at process block 664, the received broadcast location name is converted into a coordinate representation. Once converted, at process block 655, the coordinate representation of the broadcast location name is compared to a coordinate representation of the message delivery location. At process block 657, it is determined whether the coordinate representation of the broadcast location name matches the coordinate representation of the message delivery location. When such is detected, at process block 668, the location-based message is delivered to a user of the wireless device. Otherwise, control flow branches to process block 612 of FIG. 7 for continued monitoring of the spatial location of the wireless device, in accordance with one embodiment.

Figure 14:
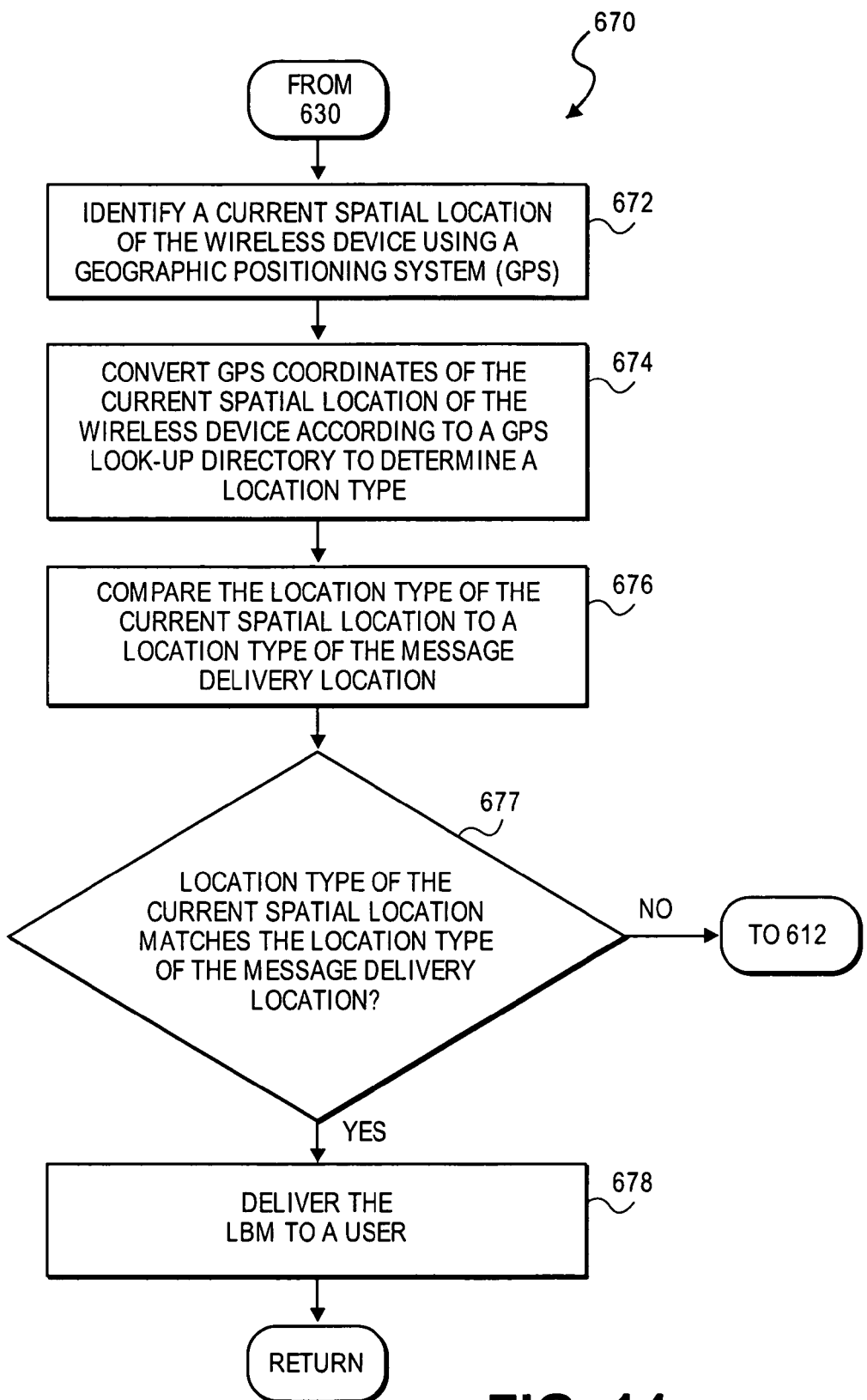
FIG. 14 is a flowchart illustrating a method for determining whether a location type of a current spatial location of a wireless device matches a location type of a message delivery location, in accordance with one embodiment.

FIG. 14 is a flowchart illustrating a method 670 for delivery of a location-based message to a wireless device once the wireless device has reached the message delivery location, in accordance with one embodiment. At process block 672, a current spatial location of the wireless device is identified using a geographic positioning system (GPS). In one embodiment, such functionality is provided within a wireless device by providing a GPS receiver in the wireless device. Otherwise, such GPS information is determined by a base station and communicated to the wireless device or simply tracked by the base station to determine whether a current spatial location of the wireless device is identified as a message delivery location.

At process block 674, GPS coordinates of the current spatial location of the wireless device are converted to determine a location type of the current spatial location of the wireless device. In one embodiment, such conversion is performed using, for example, a GPS look-up directory to determine a location type of the current spatial location wireless device. At process block 676, the location type of the current spatial location of the wireless device is compared to a location type of a message delivery location. At process block 677, it is determined whether the location type of the current spatial location matches the location type of the message delivery location. When such is the case, the location-based message is delivered to a user.

In accordance with one embodiment, a user may desire the delivery of, for example, location-based message whenever the user is at, for example, a store. Accordingly, in such an embodiment, "location type" refers to a store. However, it should be recognized that location types may refer to any and all commercial establishments or other like outdoor venues that a user may desire delivery of or issuance of a location-based message according to a location-based message request.

Figure 15:
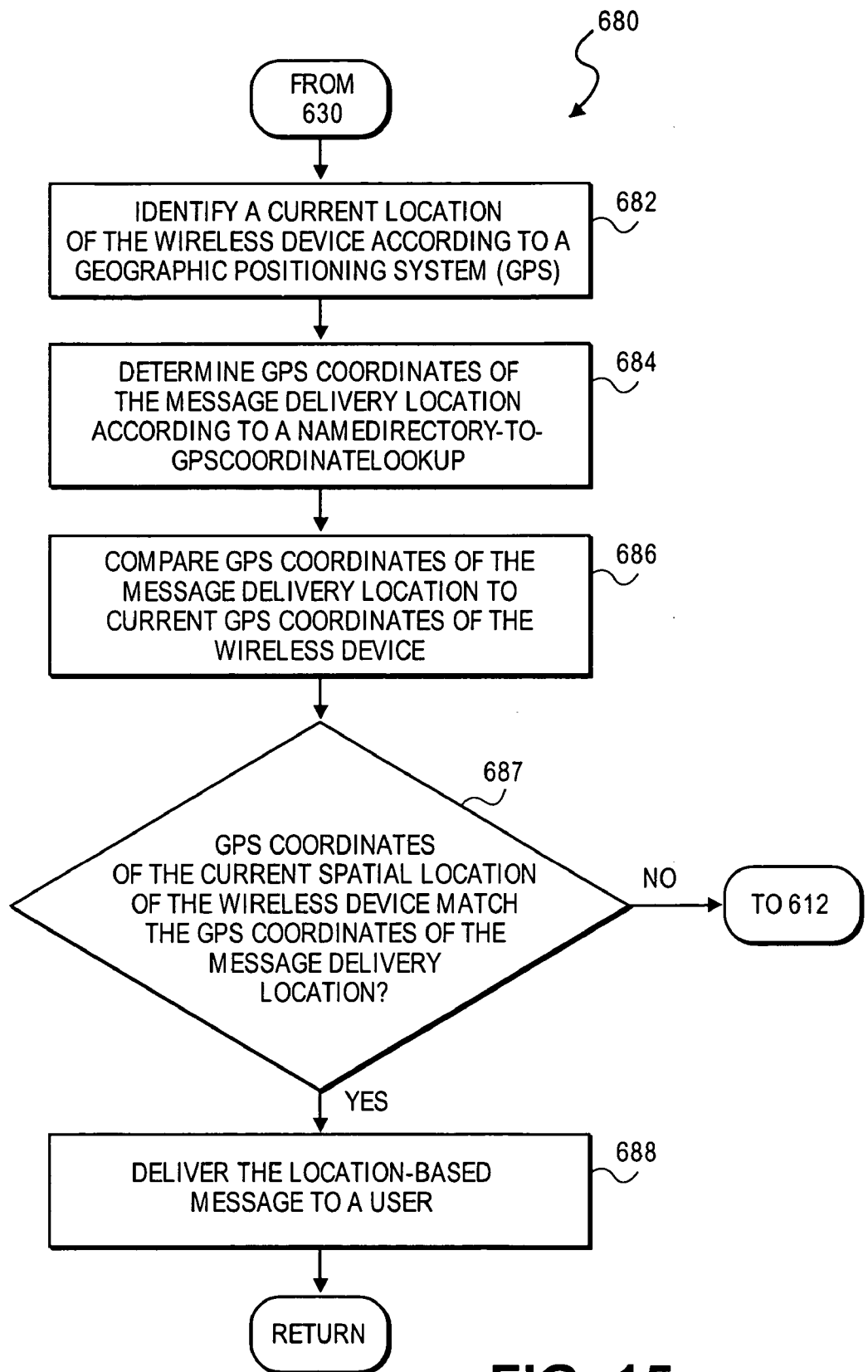
FIG. 15 is a flowchart illustrating a method for determining whether a wireless device has reached a message delivery location according to graphic positioning system (GPS) coordinates of the wireless device, in accordance with one embodiment.

FIG. 15 is a flowchart illustrating a method 680 for delivery of a location-based message request when a wireless device has reached a message delivery location, in accordance with one embodiment. At process block 682, a current spatial location of a wireless device is identified according to GPS coordinates. Once determined, at process block 684, GPS coordinates of the message delivery location may be determined according to a namedirectory-to-GPScoordinate-lookup, for example, as provided by the cellular infrastructure, the cellular provider or other like means.

At process block 686, the GPS coordinates of the message delivery location are compared to current GPS coordinates of the wireless device. Once compared, at process block 687, it is determined whether the GPS coordinates of the current spatial location of the wireless device match the GPS coordinates of the message delivery location. When such is detected, at process block 686, the location-based message is delivered to the user. In the embodiment described with reference to the method 680, as shown in FIG. 15, the exact spatial location of the wireless device may be identified as matching the exact spatial location of the message delivery location. However, other means for approximating whether a wireless device has reached a message delivery location are also possible, while remaining within the scope of the described embodiments.

Figure 16:
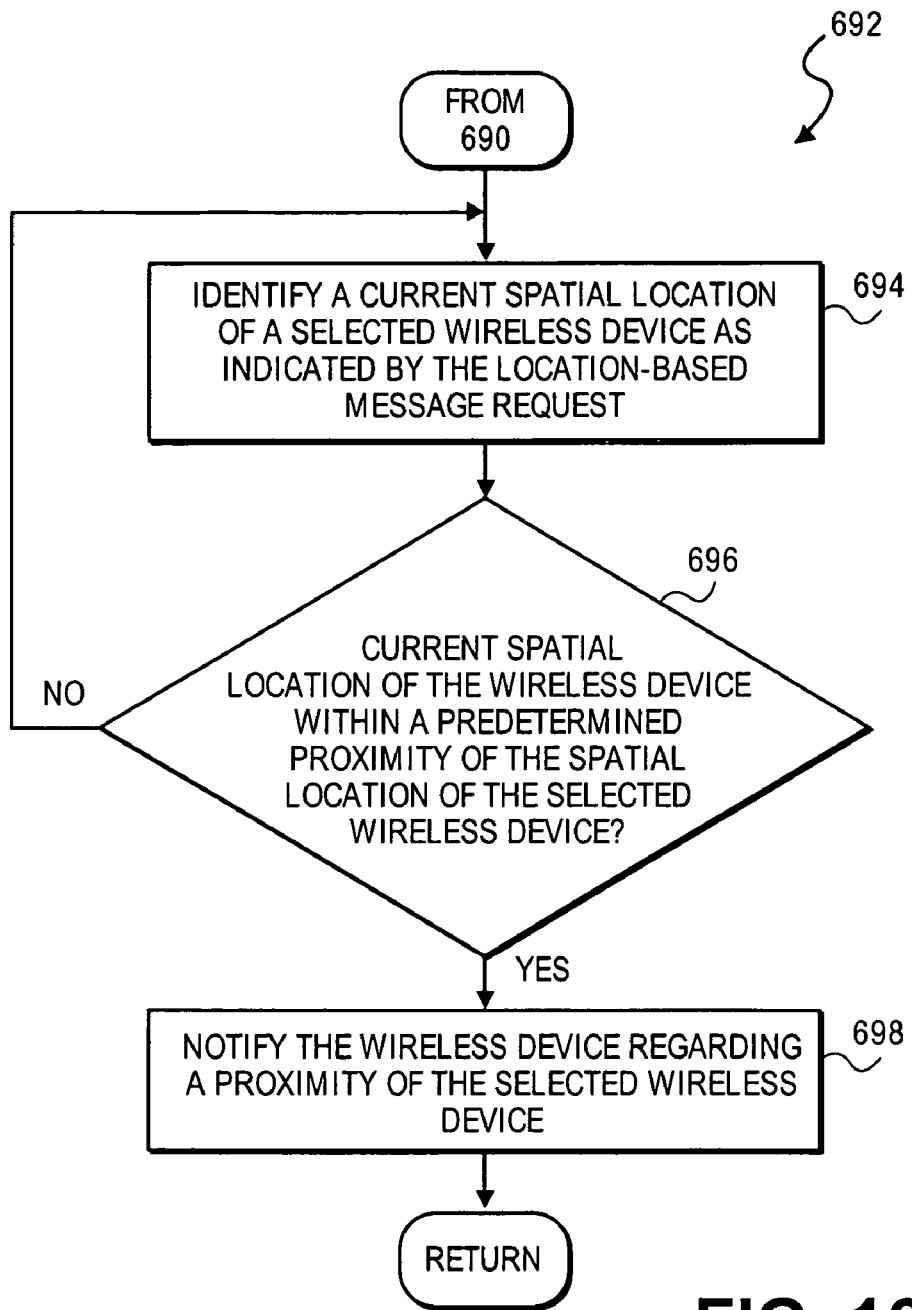
FIG. 16 is a flowchart illustrating a method for notifying a wireless device when a selected wireless device is within a predetermined proximity of the wireless device, in accordance with one embodiment.

FIG. 16 is a flowchart illustrating a method 690 for a location-based message for a notification circle, in accordance with one embodiment. As described herein, a notification circle may refer to one or more individuals, which a user desires notification of when such users are within a predetermined proximity of the user. Accordingly, at process block 694, a current spatial location of a selected wireless device is identified as indicated by the location-based message request issued by a user. At process block 696, it is determined whether a current spatial location of the wireless device is within a predetermined proximity of the spatial location of the selected wireless device. When such is detected, at process block 698, the wireless device is notified of the proximity of the selected wireless device.

In accordance with one embodiment, the user may have the option of notification when a specific person, referred to herein as a "selected destination wireless device" is within the predetermined proximity or distance, such as 50 yards from the user's wireless device. When such is the case, the user may be notified that a friend is close by, typically requiring the permission of both parties.

Alternate Embodiments

Several aspects of one implementation of the location-based message for providing location-based messages within wireless networks are described. However, various implementations of the location-based message provide numerous features including, complementing, supplementing, and/or replacing the features described above. Features can be implemented as part of the base station (access point) or as part of the wireless devices in different embodiment implementations. In addition, the foregoing description, for purposes of explanation, used specific nomenclature to provide a thorough understanding of the embodiments of the invention. However, it will be apparent to one skilled in the art that the specific details are not required in order to practice the embodiments of the invention.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the embodiments of the present invention to the full extent indicated by the broad general meaning of the terms in which the appended claims are expressed.

Having disclosed exemplary embodiments and the best mode, modifications and variations may be made to the disclosed embodiments while remaining within the scope of the embodiments of the invention as defined by the following claims.

What is claimed is:

1. A method comprising:
    monitoring a spatial location of a wireless device;
    communicating a location-based message if, during the monitoring of the spatial location of the wireless device, a current spatial location of the wireless device is identified as a message delivery location;
    determining a signal strength of at least one signal received by the wireless device;
    calculating multipath and radio frequency (RF) propagation values according to one or more predetermined characteristics of the received signal; and
    identifying an approximate spatial location of the wireless device according to the signal strength and the calculated multipath and RF propagation values.

2. The method of claim 1, wherein monitoring the wireless device further comprises:
    comparing an identified spatial location of the wireless device with coordinate boundaries of the message delivery location; and
    when the wireless device is physically located within the coordinate boundaries of the message delivery location, transmitting the location-based message to one of the wireless device, a user of the wireless device and a destination wireless device selected by the user of the wireless device.

3. The method of claim 2, wherein prior to monitoring the wireless device, the method further comprises:
    storing a location-based message by the wireless device; and
    storing, by the wireless device, a message delivery location for the stored location-based message.

4. The method of claim 3, wherein storing the message delivery location further comprises:
    requesting information for identification of the message delivery location; and
    processing one or more received values to establish the coordinate boundaries as an internal representation of the message delivery location.

5. The method of claim 4, wherein processing the received values further comprises:
    receiving a message delivery location address;
    determining coordinates of the message delivery location address for the wireless device according to a geographic positioning system (GPS).

6. The method of claim 1, wherein monitoring the spatial location of the wireless client further comprises:
    converting an approximate spatial location of the wireless device into one or more coordinate values;
    comparing the one or more coordinate values to an internal representation of the message delivery location; and
    when the one or more coordinate values fall within the internal representation of the message delivery location, delivering the location-based message to a destination wireless device selected by a user of the wireless device.

7. The method of claim 1, wherein communicating the message to the user further comprises:
    receiving a broadcast location name from a wireless access point;
    converting the received broadcast location name to a coordinate representation;
    comparing the coordinate representation of the broadcast location name to a coordinate representation of the message delivery location; and
    delivering the location-based message to a user of the wireless device if the coordinate representation of the broadcast location name matches the coordinate representation of the message delivery location.

8. The method of claim 1, wherein communicating the message to the user further comprises:
    identifying a current spatial location of the wireless device using a geographic positioning system (GPS);
    converting GPS coordinates of the current spatial location of the wireless device to determine a location type of the current spatial location of the wireless device according to a GPS look-up directory;
    comparing the location type of the current spatial location to a location type of the message delivery location; and
    delivering the location-based message to a user of the wireless device if the location type of the current spatial location matches the location type of the message delivery location.

9. The method of claim 1, wherein communicating the message to the user further comprises:
    identifying a current location of the wireless device according to a geographic positioning system (GPS);
    determining GPS coordinates of the message delivery location according to a namedirectory-to-GPScoordinate-lookup;
    comparing GPS coordinates of the message delivery location to current GPS coordinates of the wireless device; and
    delivering the location-based message to a user of the wireless device if the GPS coordinates of the current spatial location of the wireless device match the GPS coordinates of the message delivery location.

* * * * *